(12) United States Patent
Matson et al.

(10) Patent No.: US 9,792,669 B2
(45) Date of Patent: Oct. 17, 2017

(54) METHOD AND APPARATUS FOR SYNTHESIS OF HIGHER RESOLUTION IMAGES

(71) Applicant: MBDA UK Limited, Stevenage, Hertfordshire (GB)

(72) Inventors: Gary Paul Matson, Filton (GB); Andrew John Sherriff, Filton (GB); Robert James Middleton, Filton (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 0 days.

(21) Appl. No.: 14/908,624

(22) PCT Filed: Jul. 30, 2014

(86) PCT No.: PCT/GB2014/052329
§ 371 (c)(1),
(2) Date: Jan. 29, 2016

(87) PCT Pub. No.: WO2015/015196
PCT Pub. Date: Feb. 5, 2015

(65) Prior Publication Data
US 2016/0171657 A1 Jun. 16, 2016

(30) Foreign Application Priority Data
Jul. 31, 2013 (GB) .................................. 1313680.9

(51) Int. Cl.
*G06T 3/40* (2006.01)
*G06T 5/00* (2006.01)
*G06T 5/50* (2006.01)

(52) U.S. Cl.
CPC .......... *G06T 3/4076* (2013.01); *G06T 3/4053* (2013.01); *G06T 3/4069* (2013.01);
(Continued)

(58) Field of Classification Search
CPC ......... G06T 3/4076; G06T 5/003; G06T 5/50; G06T 2207/20216; G06T 3/4053; G06T 3/4069
See application file for complete search history.

(56) References Cited

U.S. PATENT DOCUMENTS

H001914 H * 11/2000 Watkins ................. H04N 7/181
348/143
6,483,538 B2 * 11/2002 Hu ........................ G06T 7/0026
348/180

(Continued)

FOREIGN PATENT DOCUMENTS

EP          2575104 A1      4/2013
JP       2005071223 A  *    3/2005
WO    WO 2009/126445 A1   10/2009

OTHER PUBLICATIONS

Brailey, D. ("Super-resolution for bar codes," J. Electronic Imaging 10(1), 213-330, Jan. 2001).*

(Continued)

*Primary Examiner* — Yubin Hung
(74) *Attorney, Agent, or Firm* — Scully, Scott, Murphy & Presser, PC

(57) ABSTRACT

In an image-processing method, a stack is provided for storing a predetermined number of frame portions. An image including a target object is obtained, the image being formed by an array of pixels. A frame portion is extracted from the image, the frame portion being at least a portion of the pixels forming the image, corresponding to a region of interest in the image, the region of interest comprising the target object. The frame portion is stored in the stack, the storing including discarding an oldest previously stored frame portion from the stack if the number of frame portions stored in the stack has reached the predetermined number. The steps of the method are repeated a plurality of times. Frame portions in (Continued)

the stack having a phase substantially equal to a given phase are averaged. A super-resolved image is calculated from the plurality of stored frame portions.

14 Claims, 5 Drawing Sheets

(52) U.S. Cl.
CPC ............... *G06T 5/003* (2013.01); *G06T 5/50* (2013.01); *G06T 2207/20216* (2013.01)

(56) References Cited

U.S. PATENT DOCUMENTS

| | | | |
|---|---|---|---|
| 7,860,344 | B1 | 12/2010 | Fitzpatrick et al. |
| 2008/0199078 | A1* | 8/2008 | Lam .................... G06T 7/003 382/190 |
| 2009/0297059 | A1* | 12/2009 | Lee ..................... G06K 9/40 382/275 |
| 2010/0014709 | A1 | 1/2010 | Wheeler et al. |
| 2010/0172556 | A1* | 7/2010 | Cohen ................. A61B 6/5217 382/128 |
| 2010/0259607 | A1* | 10/2010 | Kennedy .............. F41G 7/2253 348/113 |
| 2011/0170784 | A1* | 7/2011 | Tanaka ................. G06T 3/4069 382/195 |
| 2012/0230555 | A1* | 9/2012 | Miura ................ G06K 9/00087 382/124 |
| 2013/0077821 | A1* | 3/2013 | Chen ..................... G06T 3/4053 382/103 |
| 2014/0064586 | A1* | 3/2014 | Peacock, III ...... G01R 33/4625 382/131 |

OTHER PUBLICATIONS

Roeder et al. (Assessment of super-resolution for face recognition from very-low resolution images in sensor network, Proc. Of SPIE, vol. 7341, 2009).*
International Search Report dated Nov. 19, 2014 issued in PCT/GB2014/052329.
GB Search Report dated Jan. 31, 2014 issued in GB1313680.9.
Park, Sung Cheol et al., "Super-Resolution Image Reconstruction: A Technical Overview", IEEE Signal Processing Magazine (May 1, 2003), vol. 20, No. 3, pp. 21-36.
International Preliminary Report on Patentability together with the Written Opinion from related International Application No. PCT/GB2014/052329 dated Feb. 11, 2016.

* cited by examiner (a)       (b)

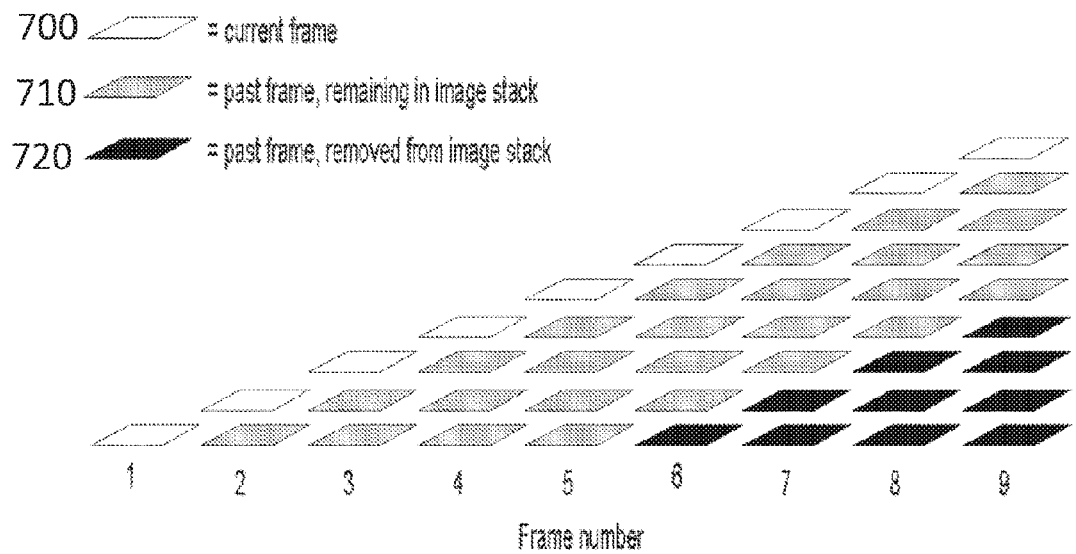

METHOD AND APPARATUS FOR SYNTHESIS OF HIGHER RESOLUTION IMAGES

FIELD OF THE INVENTION

This invention relates to the field of image processing, and in particular to the generation of a higher-resolution image from a plurality of lower-resolution images. The invention relates especially, but not exclusively, to the field of image-processing in homing missiles.

BACKGROUND OF THE INVENTION

The accuracy of detection, recognition, identification and tracking using electro-optical sensors is critically dependent upon image quality; hence improved image quality can be expected to result in increased performance. However, in some applications there is a need to strike a balance between, on the one hand, obtaining the best possible image quality and, on the other hand, obtaining an image quickly and with processor and other hardware requirements that are not too demanding. For example, in the field of homing missiles, provision of images of higher quality than those provided by existing systems would increase the distance over which an image processing system associated with the missile can operate successfully, allowing the operator to fire earlier and remain out of harm's way, and/or would reduce cost, weight and development risk. However, homing missiles are typically of limited size and weight, and travel at very high velocity relative to their target, and there are therefore significant limitations on the image-processing techniques that can be used. Several prior-art image processing techniques that provide high quality images are slow and computationally demanding.

It would be advantageous to provide a method and apparatus for image processing in which the aforementioned disadvantages are reduced or at least ameliorated.

DISCLOSURE OF THE INVENTION

A first aspect of the invention provides an image-processing method comprising the steps of:
(i) providing a stack for storing a predetermined number of frame portions;
(ii) obtaining an image including a target object, the image being formed by an array of pixels;
(iii) extracting a frame portion from the image, the frame portion being at least a portion of the pixels forming the image, corresponding to a region of interest in the image, the region of interest comprising the target object;
(iv) storing the frame portion in the stack, the storing including discarding an oldest previously stored frame portion from the stack if the number of frame portions stored in the stack has reached the predetermined number;
(v) repeating steps (ii) to (iv) a plurality of times; and
(vi) calculating a super-resolved image from the plurality of stored frame portions.

It may be that the frame portion extracted in each iteration of step (iii) after the first iteration corresponds to a region of interest identified in the image used in the first iteration of step (iii).

Creating super-resolved images from a plurality of images is a known technique for synthesising a higher resolution image from a plurality of lower-resolution images. It is used for example in astronomy to generate significant improvements in the resolution of objects of astronomical interest. However, known super-resolution techniques, for example in astronomy, are slow and require a great deal of computer processing power. Advantageously, the method of the invention is a method of generating super resolved images that is quicker and less computationally demanding than such prior-art techniques. In some embodiments, it is capable of providing super-resolved images even of objects in rapid motion relative to the detector. It may be that the method provides the super-resolved images in real time.

It may be that the method is carried out using an imager and at least one general- or special-purpose microprocessor.

It may be that the target object is identified in a first image obtained from the imager. It may be that the target object is identified in the first image by a user. It may be that the target object is identified in the first image by a target recognition algorithm.

It may be that the region of interest is defined in an image obtained from the imager and then calculated in subsequent images. It may be that the region of interest in the image is defined by a user. It may be that the region of interest in the image is defined by an algorithm, for example an object-recognition algorithm.

It may be the super resolution image is calculated using the current image stack and the registration of a pair of successive images computed from tracking.

It may be that the target is tracked between images. It may be that the target is assumed to be at the position of the target in a previous image. It may be that the position of the target in the image is determined using cross-correlation. It may be that the cross-correlation is with a de-resolved version of a super resolution image calculated in a previous iteration of the method. It may be that a shift in the position of the target in successive images is calculated, and the integer part of the calculated shift is used to shift the region of interest in the later image relative to the position of the region of interest in the earlier image.

It may be that a working frame portion is extracted from each subsequent image. It may be that the working frame portion is extracted from the approximate location of the target object in the preceding image, for example the same set of pixel locations as were extracted to form the previous frame portion. It may be that the working frame portion is cross-correlated with a de-resolved image from the preceding iteration of the method. It may be that the change in position of the target in the working frame portion compared with the position of the target in the de-resolved image is thereby obtained. It may be that the change in position is broken down into a shift of a whole number of pixels and a shift of a fraction of a pixel. It may be that the integer shift is used to define a location for a further frame portion, i.e. the location of the preceding frame portion is translated by the integer shift to give the location for the further frame portion. It may be that the pixels forming the further frame portion, corresponding to a re-located region of interest, are extracted.

It may be that the translation shift between a pair of images is calculated by a correlation. It may be that the translation shift between a pair of images is calculated by a correlation in the spatial domain. It may be that translation shift between a pair of images is calculated by phase correlation in the frequency domain. It may be that the translational shift between a pair of images is calculated by an iterative method in which a translation shift calculated by a correlation in the spatial domain or by a phase correlation in the frequency domain is used as an initial guess to constructed an estimated super resolved image and the registration is adjusted iteratively to produce an improved super resolved image.

It may be that each image, and thus each extracted frame portion, has an associated phase, representative of the sub-pixel translation shift of the region of interest defined by the frame portion, the phase effectively being ascertained by the method. The phase may be ascertained by means of ascertaining the translation shift of the image in the spatial domain or frequency domain.

It may be that the step of calculating the super-resolved image from the stored frame portions includes a sub-step of averaging all frame portions in the stack having a phase substantially equal to a given phase. It will be appreciated that at least some frame portions of a given phase will be spatially shifted from other frame portions of substantially the same given phase by an integer number of pixels. It may be that the calculation of the super-resolved image includes averaging all regions of interest that are of the same phase. The data representing such regions of interest or frame portions once created by averaging regions of interest or frame portions having the same phase will conveniently be referred to below as a "phase average". It may be that the super-resolved image is calculated from a plurality of such phase averages. The weighting applied to each phase average in calculating the super-resolved image may be substantially the same. Thus, it may be the case that when one phase average is calculated from a different number of frame portions from another phase average, the effective weighting applied to each frame portion in the stack when calculating the super-resolved image will be different. It may be that the sub-step of averaging all frame portions in the stack having substantially the same phase is conducted before the super-resolved image is finally calculated from the plurality of stored frame portions. The sub-step may be an intermediate step.

It may be that the calculation of the super-resolved image includes enlarging the averaged regions of interest by a super resolution scale factor and averaging pixels across all phases, accounting for subpixel shifts. It may be that calculating a super-resolved image from the plurality of stored frame portions includes updating a super-resolved image calculated in a previous iteration by changing in the calculation only the phases which have changed in a new frame. It may be that calculating a super-resolved image from the plurality of stored frame portions includes updating a super-resolved image calculated in a previous iteration by removing the oldest frame from its corresponding phase average, adding the new frame to its corresponding phase average, and updating the phase average over phases with the two modified phases. It will be appreciated that by removing the oldest frame, having a first phase, and adding a new frame having a second (typically different) phase, two of the phase averages will be calculated using a different number of frame portions as compared to the previous calculation. As such, the effective weighting given to the individual frame portions as combined to create the super-resolved image will typically vary. It may be that a translation shift between a first pair of frame portions is calculated and the resulting calculated translation shift is used in calculating a first super-resolved image derived from a first set of frame portions including said first pair of frame portions. Subsequently, a second super-resolved image may be calculated from a second set of frame portions, different from the first set, but still including said first pair of frame portions, wherein the second super-resolved image is calculated using the previously calculated translation shift. There may then be no need to recalculate the previously calculated translation shift when calculating the second super-resolved image, resulting in more efficient image processing. The previously calculated translation shift may originally be calculated in a manner other than comparing a pair of frame portions. For example, the relative registration of a pair of successive frame portions may be computed from a measure of tracking. Not having to recalculate a previously calculated translation shift may be of advantage in embodiments of the invention of a type for which the traditional first step of super-resolution processing would be to compute the registration of all the images to a single master image.

It may be that the calculation of the super-resolved image is carried out only on the pixels in which all of the regions of interest used in the calculation overlap. Alternatively, it may be that the calculation of the super-resolved image is carried out on all pixels in all of the regions of interest used in the calculation. It may be that the calculation of the super-resolved image is carried out using only the pixels corresponding to the pixels of the region of interest of the first image in which the target is identified.

It may be that the calculation of the super-resolved image includes a deblurring step. It may be that the deblurring is carried out using equations formulated in the image domain, rather than in either the frequency domain or in lexicographic form. It may be that the deblurring is carried out using a Bayesian maximum a posteriori method.

It may be that the calculation of the super-resolved image is bypassed on each iteration until a predefined minimum number of frame portions have been stored on the stack, for example until the stack is full.

It may be that the super-resolved images are output to a user. It may be that the super-resolved images are passed to a further automated unit, where they are used in further automated processes.

A second aspect of the invention provides an image-processing apparatus comprising:
(i) an imager for obtaining an image including a target object, the image being formed by an array of pixels;
(ii) a stack for storing a predetermined number of frame portions;
(iii) an image processor configured to
  a. extract a frame portion from the image, the frame portion being at least a portion of the pixels forming the image, corresponding to a region of interest in the image, the region of interest comprising the target object;
  b. store the frame portion in the stack, the storing including discarding an oldest previously stored frame portion from the stack if the number of frame portions stored in the stack has reached the predetermined number; and
  c. calculate a super-resolved image from a plurality of stored frame portions.

It may be that the image processor includes a frame grabber configured to obtain the image from the imager. It may be that the image processor includes a region of interest extraction module, to which the frame grabber provides the obtained image.

It may be that the image-processing apparatus includes a graphical user interface for a user to define the region of interest.

It may be that the image-processor includes a shift calculator configured to provide information regarding a shift of the region of interest in successive images.

It may be that the image-processor includes a cross-correlator.

It may be that the image-processor includes a super-resolution module configured to retrieve stored regions of interest from the stack and to use a fraction shift of the region of interest in successive images to create a super-resolved image from a plurality of the images.

It may be that the image processor includes a de-resolution module configured to calculate a de-resolved image and to pass it to a cross-correlator.

It may be that the output from the cross-correlator is passed to the shift calculator.

A third aspect of the invention provides a missile seeker including an image processing apparatus according to the second aspect of the invention.

A fourth aspect of the invention provides computer program product configured to cause, when the computer program is executed, data-processing apparatus to:
  (i) receive an image including a target object, the image being formed by an array of pixels;
  (ii) extract a frame portion from the image, the frame portion being at least a portion of the pixels forming the image, corresponding to a region of interest in the image, the region of interest comprising the target object;
  (iii) store the frame portion in a stack for storing a predetermined number of frame portions, the storing including discarding an oldest previously stored frame portion from the stack if the number of frame portions stored in the stack has reached the predetermined number;
  (iv) repeat steps (i) to (iii) a plurality of times; and
  (v) calculate a super-resolved image from the plurality of stored frame portions.

It will of course be appreciated that features described in relation to one aspect of the present invention may be incorporated into other aspects of the present invention. For example, the apparatus of the invention may incorporate any of the features described with reference to the method of the invention and vice versa.

BRIEF DESCRIPTION OF THE DRAWINGS

Example embodiments of the invention will now be described by way of example only and with reference to the accompanying schematic drawings, of which:

in FIGS. 7 to 9, the stack size is 100 images and the scale factor is 10);

FIG. 10 is a representation of a stack holding four frame portions; and

FIG. 11 is a representation of a method according to an example embodiment of the invention, for a low resolution pixel corresponding to a 4×4 array of high-resolution pixels, and for a stack size of 20, with the numbers in each high resolution pixel denoting the frame numbers having a phase shift corresponding to that high-resolution pixel.

DETAILED DESCRIPTION

Figure 1:
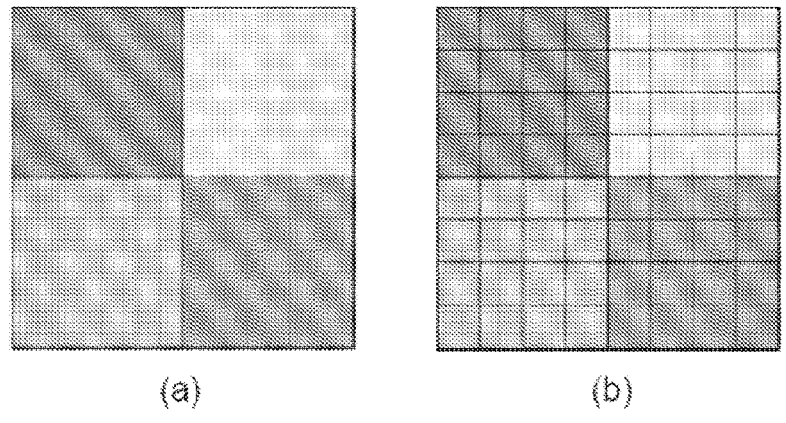
FIG. 1 is a representation of (a) four low-resolution pixels and (b) a corresponding four times sixteen high-resolution pixels.

Super-resolution algorithms have been in the open literature for a number of years, but they are slow. In example embodiments of the present invention, continual super-resolution of a region of interest (ROI) within an image is provided in real time.

A straightforward, non-real-time implementation of super resolution takes as its input a stack of low-resolution images and provides as output a single higher-resolution image. To achieve that, three principal processing steps are carried out sequentially, namely registration, summation and deblurring.

In many applications, such as astronomy, in which only a single, still, image is required from a historical image stack, very computationally demanding algorithms have been developed, to generate the best possible super-resolved image. In contrast, in example embodiments of the invention, it is not the best possible super-resolved image that is sought, but rather an image that is 'good enough' and that can be constructed in the time available (e.g. milliseconds), on the hardware available (e.g. embedded processors).

A typical missile seeker will have a sensor array of at least 320×240 pixels, and for a number of reasons it is not realistic to attempt to super-resolve the entire scene. One reason is processing power and memory requirements: there are simply too many pixels to carry out super resolution in a reasonable time, even with a powerful processor. Another reason is that, if the target motion and background motion are different, it will not be possible to super resolve both and, in a typical scenario where the target is small, doing so would result in an image in which the background was super-resolved but the target was smeared out, which would be worse than the original image. It is desirable instead to super-resolve a small patch of the image denoted as a region of interest (ROI).

In the super-resolution of an ROI, an image stack is constructed, and each image within the stack contains the target of interest. The image stack is then processed to construct the super-resolved image. When provided with an image sequence, a target is defined in the first frame (either by an operator or by some upstream algorithm) and a region of interest around this target extracted and added into position one of the image stack. At this stage, super resolution of the image stack (with only a single image) yields simply the original image.

In subsequent frames, the designated target is tracked and further ROIs extracted. There are many different ways in which the target could be tracked, but the method used in this example is cross-correlation using a deresolved version of the current super-resolution image. This tracking method is used for two reasons. Firstly, the deresolved version of the super-resolution (SR) image is a prediction of what the image should look like at the base resolution of the sensor. It is inherently very stable, and contains less noise than any of the isolated images because the noise has been averaged out by the SR process. Secondly, a number of the computations carried out to do tracking in this way can be reused by the SR process to reduce computational load.

When provided with a new frame, an image patch is extracted at the approximate location of the ROI. On the assumption that the target motion within the field of view is small, this can simply be the ROI position from the previous frame; if that is not the case a more sophisticated tracker can be used to seed the approximate ROI position. This image patch is registered to sub-pixel accuracy with the deresolved version of the current SR image. The integer part of the computed shift is used to shift the extraction window within the field of view and the new target ROI is extracted, such that only a fractional shift exists. This fractional part of the shift is propagated into the SR algorithm to provide the sub-pixel motion required by the algorithm.

In frame two, the extracted ROI is added to position two of the image stack and super-resolution carried out on the image pair. Moving onto the third frame, the ROI is added to position three of the stack and so on until the image stack is fully populated. The SR image will continue to be refined as more images are added to the stack. However, the stack is of finite size, because the computational burden increases the larger it is, and also because a large stack implies a large time difference between the newest and oldest ROI (which increases the chance of an image distortion occurring, e.g. a perspective change, which is not modelled by the SR algorithm in this example).

Once the image stack is fully populated, subsequent images are added into the stack by removing the oldest ROI and inserting the new one. The previously computed image registrations do not need to be adjusted, as they are all calculated referenced to the SR image. This results in the image stack being a sliding window of ROIs, depicted in FIG. 10, in which the uppermost frame 700 of each stack 1-9 represents the new (current) frame, the bottom 1, 2, 3 and 4 frames 720 in stacks 6 to 9 represent the discarded (past) frames, and the other frames 710 represent frames stored in the stacks from previous iterations (the bottom 1, 2 and 3 frames in stacks 2, 3 and 4 respectively, and the four frames below the uppermost frame in stacks 5-9).

After this process, the image stack only contains ROIs that differ by a fraction of a pixel, as the integer pixel shift has been accounted for in the extraction process. The traditional first step of super-resolution processing is to compute the registration of all the images to a single master image, but in this example method that has already been computed, and so is not repeated; instead it is an input to the main super-resolution processing function which now only computes the image sum and carries out deblurring.

The summation process comprises first averaging all images that are of the same phase (i.e. have the same fractional shift) and then enlarging those average images of each phase by the super-resolution scale factor and averaging pixels across all phases, accounting for the sub-pixel shifts. This step results in a blurred super-resolution image. Processing in this stage of the algorithm can be reduced considerably by observing that a great deal of the computation is repeated at each frame and hence the results can be saved and reused instead of recomputed. For each new image a maximum of two phases are changed: the phase containing the image that is removed from the stack and the phase containing the image that is added to the stack. All the other phases remain the same, and so do not need to be recomputed.

An example to describe this process is now given (FIG. 11) for a super-resolution magnification factor of four, in which each low-resolution pixel is sub-divided into a 4×4 grid, resulting in a total of 16 different phases, for a stack size of 20. The array in FIG. 11(a) gives an example coverage map of 20 image frames. If each image is shifted by the computed phase shift, the super resolution image in this example is constructed as:

$$I_{SR} = \frac{1}{12}\Big(\frac{I_1 + I_7 + I_{18}}{3} + \frac{I_8 + I_{19}}{2} + I_{15} + \frac{I_6 + I_9 + I_{12}}{3} + I_{20} + \frac{I_5 + I_{16}}{2} + I_{13} + I_{10} + \frac{I_2 + I_{11}}{2} + \frac{I_3 + I_{14}}{2} + I_{17} + I_4\Big)$$

where $I_{SR}$ is the intensity of the super-resolution pixel, and $I_n$ is the intensity of the nth image frame in the stack.

If, for the next frame (FIG. 11(b), image 1 is removed from the stack and image 21 is added at the same phase as image 10, the new super-resolution image is constructed as:

$$I_{SR} = \frac{1}{12}\Big(\frac{I_7 + I_{18}}{2} + \frac{I_8 + I_{19}}{2} + I_{15} + \frac{I_6 + I_9 + I_{12}}{3} + I_{20} + \frac{I_5 + I_{16}}{2} + I_{13} + \frac{I_{10} + I_{21}}{2} + \frac{I_2 + I_{11}}{2} + \frac{I_3 + I_{14}}{2} + I_{17} + I_4\Big)$$

(Note the change in the $1^{st}$ and $8^{th}$ terms of the summation.) If, for the next frame, FIG. 11(c), image 2 is removed and image 22 is added at the phase in between images 14 and 17, the new super-resolution image is constructed as:

$$I_{SR} = \frac{1}{13}\Big(\frac{I_7 + I_{18}}{2} + \frac{I_8 + I_{19}}{2} + I_{15} + \frac{I_6 + I_9 + I_{12}}{3} + I_{20} + \frac{I_5 + I_{16}}{2} + I_{13} + \frac{I_{10} + I_{21}}{2} + I_{11} + \frac{I_3 + I_{14}}{2} + I_{22} + I_{17} + I_4\Big)$$

(Note the change in the $9^{th}$ term, the introduction of the $I_{22}$ term, and the change in the denominator of the multiplier outside the bracket.)

(In each of the preceding two equations, the difference from the previous frame is emphasised by means of a slightly larger font in bold-italic.) For each update, the two phases that are changed are removed, re-computed and then added back in. Thus, updating the summed image with a new frame involves: (i) removing the oldest frame from its corresponding phase mean; (ii) adding the new frame to its corresponding phase mean, and (iii) updating the mean over phases with the two modified phases. It is implicit that by doing this the effective weighting given to the individual frames changes as the make-up of the phase means varies over time. The weighting of the frames in the stack are thus not uniform across the stack. The weighting of the frames may also vary with time, in dependence on how many frames in the stack correspond to a given phase. With the summed image calculated, deblurring can now be carried out, to remove blurring that is inherent in the super-resolution process, and also any additional blur incurred from the image capture process. The deblurring method used in this example is a Bayesian maximum a-posteriori (MAP) method, which is an iterative method. Every iteration of the deblurring algorithm is computationally expensive and hence, for real-time applications, it is not feasible to iterate to convergence, and instead only a fixed number of iterations are computed. The deblurring algorithm is often described in the literature in lexicographic notation, in which images are expressed as column vectors, which allows an easy exposition of the formulae involved; however, to write software in this way results in very large (but sparse) matrices. It was found that this form was intractable for real-time use and hence all operations are carried out within the image domain (i.e. a blur operation is a convolution rather than a matrix multiplication).

The foregoing overview of the example method can be summarised as follows:
  a region of interest (ROI) is chosen from an image frame;
  the ROI is tracked in subsequent frames using cross-correlation with the deresolved SR image calculated using previous frames;
  each new ROI added to the image stack, and if the stack is full then the new image replaces the oldest image;
  the super-resolution image is constructed using the current image stack and the registration computed from tracking;
  image summation only occurs for the phases which have changed for this frame (a maximum of two phases);
  deblurring of the summed image is carried out using equations formulated within the image domain;
  deresolution of the SR image is carried out for extraction of the ROI in the next frame.

The resultant production of real time super-resolution images allows enhanced performance of, for example, an electro-optical sensor, allowing reductions in cost, weight and development risk. The system can present improved images for example to an operator in the loop or to downstream algorithms.

Aspects of example embodiments of the invention will now be further discussed in more detail.

The first part of most super-resolution (SR) algorithms is image registration, in which multiple low-resolution (LR) images are registered to one another. There are various ways to calculate the translational shift between a pair of images. Correlation in the spatial domain is a robust method but relatively slow to implement, especially for large images. A much faster method, but not as robust for small images, is phase correlation in the frequency domain. In a further, iterative, method the result from one of the two previous methods is used as an initial guess to construct an estimated SR image and the registration is iterated to produce the optimal SR image.

As described above, after calculation of the pixel shifts for image registration, the multiple LR images are summed using a process termed "simple stacking". In this method, the LR images are upscaled to the pixel density desired for SR, using nearest neighbour interpolation. The upscaled images are then stacked on top of each other at the correct location using the pixel shifts calculated previously. The mean of all the LR pixel values is then taken for each SR pixel, generating a single SR image. That process generates an image that is blurred, even if all the registration parameters are known exactly, and so the final step of the super resolution process is to deblur the mean-value image.

Thus, the first step of a super-resolution algorithm, but a step which is scantly mentioned in the super-resolution literature, is to register a sequence of low resolution images with each other to within sub-pixel accuracy. Three different example methods of aligning the images are described in turn below. All of these example methods assume that the only motion between images is translational motion, with other types of motion such as rotation and scale change not accounted for; that forces each transformation vector to contain two elements, indicative of a horizontal and a vertical translation. Such translational motion could occur for example as a result of jitter at the lens of the camera, caused for example by a camera travelling on a moving vehicle or aircraft, or by target motion within the scene. In the case of a stationary camera with target motion within the scene, the image is close-cropped to the target so that image registration algorithms are not deceived by the stationary background.

In these examples, all images are registered relative to the first image of the sequence. With this choice, the initial transformation vector is equal to zero and all subsequent transformation vectors contain the horizontal and vertical displacement of the current image from image 1. This framework is used in descriptions of the different methods below, in which it is assumed only two images, image 1 and image 2, need to be registered together; the registration process is then repeated for each subsequent image.

Correlation in the spatial domain is an intuitive and robust, yet relatively slow, computational method for image registration. In this method, the two images are overlaid on top of each other at different integer pixel displacements and correlation carried out on the overlapping region. The correlation is, in this example embodiment, computed from the absolute value of the difference between each pair of pixels: the mean of those values, taken across the entire region, gives a measure of how well the two images align (it will be appreciated that different correlation techniques, such as "difference squared" methods could be used in alternative embodiments). With perfect overlap, the mean pixel difference vanishes, and hence the lower this measure the better the alignment. The process is continued at all integer pixel displacements within a predefined overlap, to build a correlation surface. The predefined overlap can be made larger for an increase in the speed of computation or reduced to allow larger motion to be accounted for; a value of 66% could be chosen for example, i.e. an image is assumed to have translated by less than a third of its width or height.

Upon completion of the correlation surface, the integer pixel displacement of image 2 from image 1 can be computed by finding the location of the minimum value of the array. In order to extend this estimate to include sub-pixel shifts, we consider the correlation surface about this minimum. By fitting a quadratic function through values of the minimum point and the two points adjacent to it, above and below, and subsequently finding the location of the minimum of this function, an estimate of the vertical sub-pixel displacement is obtained; repeating similarly in the horizontal direction provides a complete sub-pixel position. (This example method assumes there is no coupling between the vertical and horizontal directions.)

A very fast (and for large images robust) alternative method of determining the registration of two images is to carry out phase correlation in the frequency domain. This is a well-tested method of calculating integer pixel shifts which has been recently extended to incorporate sub-pixel shifts.

If it is known that two images are identical except for a translation, it is possible to write one as a function of co-ordinates that are shifted by a fixed amount relative to the co-ordinates of the other. The phase correlation matrix is defined as the normalised cross-power spectrum between the Fourier transforms of those functions when so written. Taking the inverse Fourier transform of the phase correlation matrix yields a delta function centred at the translation, and hence yields the translation itself.

Typically, in the case of integer pixel shift, the phase-correlation method provides a much stronger and more detectable peak than that obtained through spatial correlation; however, when dealing with fractional pixel shifts the delta function peak becomes spread over multiple pixels making determination of the shift inaccurate.

One method to overcome this problem is to over-sample the images to higher resolution before carrying out phase correlation; however, this will dramatically increase computational loading. The approach taken in this example is to solve the problem in the frequency domain, and hence to eliminate the need to compute an inverse Fourier transform. In the frequency domain, the only relevant variable is the phase shift, containing the two unknown parameters of the translation. The phase shift, when unwrapped from the inherent 2*pi wrapping, forms a plane which passes through the origin and hence from this plane one can determine the values of the parameters of the translation.

A third approach is to carry out image registration at the same time as optimising the super-resolution image with an iterative method. Assuming an initial registration, which could simply be that each image has zero shift, or using one of the above methods to provide a preliminary estimate, an initial super resolution image is constructed using the stacking method described below. From this estimate of the real world scene the observation model can be applied, without noise or blur terms, to approximate the original LR images. This equates to carrying out averaging over high resolution (HR) pixel blocks to estimate the LR pixel values. These estimated LR images can be compared with the original LR images and the registration adjusted until some cost measure is minimised.

After generating an estimate of the image registration, a first approximation to a super-resolution image can be constructed by stacking the images, one on top of the other, taking into account the relevant pixel shifts. A resolution enhancement factor is chosen to be an integer m, greater than unity, and each LR pixel is divided into m×m HR pixels, which is equivalent to image enlargement by a factor of m using nearest neighbour interpolation. FIG. 1 shows an example of that process, with m=4. FIG. 1(a) shows an exemplary 2×2 grid of low-resolution pixels. FIG. 1(b) shows the corresponding 8×8 grid of high-resolution pixels, following nearest-neighbour interpolation. The value of each pixel of the LR grid is assigned to a 4×4 block of pixels of the HR grid.

The translational shift has been computed on the LR scale and hence must also be multiplied by m to scale it to the HR grid. It is then rounded to the nearest integer, yielding a new shift vector. (In the case of a non-integer shift it is possible to carry out image interpolation to the nearest integer pixel; however, that has the disadvantage that it can introduce information that was not present in the original scene.)

Figure 2:
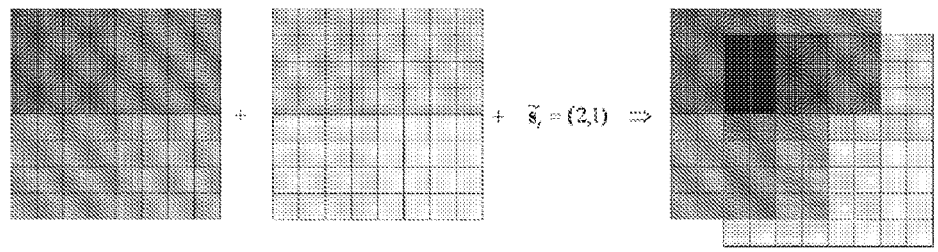
FIG. 2 is a representation of two low-resolution images and their combination.

Each up-scaled LR image is subsequently translated by the relevant translational shift vector. As an example, FIG. 2 shows two 8×8 HR grids combined following translation of the second grid relative to the first by two columns of pixels across and one row down. As can be observed in FIG. 2, the region of overlap between images is smaller than each LR image itself and hence extra information for the purpose of super resolution is not gained across the entire image. A choice is therefore made as to how boundary regions are dealt with in the SR algorithm, with options comprising:

Taking only the region of the HR image in which all LR images overlap; with a substantial number of LR images and a wide translational shift this could result in an image with considerably less coverage than the original images;

Taking all pixels including all boundary regions, this could result in a much larger image than the original image; or Taking only the pixels from the original image (i.e. the first image)

In all the work that follows, the third option, taking only pixels that are present in the original image, is chosen. The HR image in this case has pixels around the boundary which do not have contributing pixels from all LR images and also information from LR pixels that fall outside of the original image are discarded. However, this method allows the super-resolved image to be of known size, regardless of the translational shifts, and allows easy comparison with the LR images.

Figure 3:
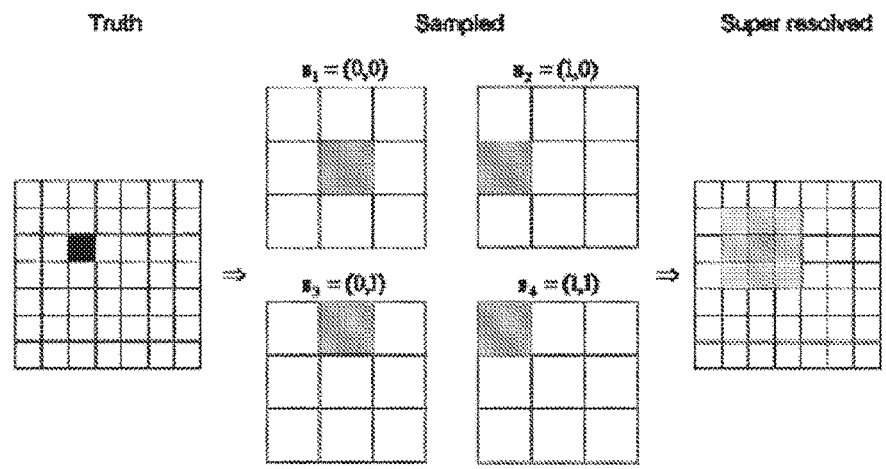
FIG. 3 is an illustration of blurring arising from super-resolution.

The super-resolution image is formed by simply averaging the HR pixels at each location, taking into account how many of the LR images contribute to each pixel. The resulting super-resolution image is a blurry representation of the real-world scene, resulting from blur from the optical system and atmospheric turbulence, but also from blur inherent in the simple stacking super resolution process, as shown in FIG. 3. In FIG. 3, a single pixel at location (3,3) in a (high-resolution) 7×7 grid is down-sampled by a scale factor of two, producing four low-resolution images, each shown on a 3×3 sample grid. The down-sampling process takes a 2×2 patch from the HR image and averages the values to form the LR pixel value. The four samples corresponding to displacements of (0,0) (i.e. no displacement), (1,0) (i.e. displacement by one row, (0,1) (i.e. displacement by one column) and (1,1), i.e. displacement by one row and one column. Those are all possible sub-pixel shifts, as any further shifts result in an integer shift on the low-resolution grid, and hence no extra information to assist super-resolution. In the four 3×3 samples, the pixel occurs in location (2,2), (2,1), (1,2) and (1,1), respectively. Applying the super-resolution simple stacking technique accurately locates the pixel at its location (3, 3) in the 7×7 grid, but the image of the pixel is spread into the nine pixels immediately adjacent to that location. If the original pixel is taken to have an intensity value of 16, the sampling and super-resolution blurring process can be understood as follows:

$$\begin{pmatrix} 0 & 0 & 0 & 0 & 0 & 0 & 0 \\ 0 & 0 & 0 & 0 & 0 & 0 & 0 \\ 0 & 0 & 16 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} \Rightarrow$$

$$s_1(0,0): \begin{pmatrix} 0 & 0 & 0 \\ 0 & 4 & 0 \\ 0 & 0 & 0 \end{pmatrix} \quad s_2(1,0): \begin{pmatrix} 0 & 0 & 0 \\ 4 & 0 & 0 \\ 0 & 0 & 0 \end{pmatrix}$$

$$s_3(0,1): \begin{pmatrix} 0 & 4 & 0 \\ 0 & 0 & 0 \\ 0 & 0 & 0 \end{pmatrix} \quad s_4(1,1): \begin{pmatrix} 4 & 0 & 0 \\ 0 & 0 & 0 \\ 0 & 0 & 0 \end{pmatrix} \Rightarrow \begin{pmatrix} 0 & 0 & 0 & 0 & 0 & 0 & 0 \\ 0 & 1 & 2 & 1 & 0 & 0 & 0 \\ 0 & 2 & 4 & 2 & 0 & 0 & 0 \\ 0 & 1 & 2 & 1 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

The blur is reduced or eliminated by applying traditional deblurring algorithms, such as a Wiener filter, the Lucy- Richardson algorithm or blind deconvolution, using the point spread function of the simple stacking super-resolution.

Figure 4:
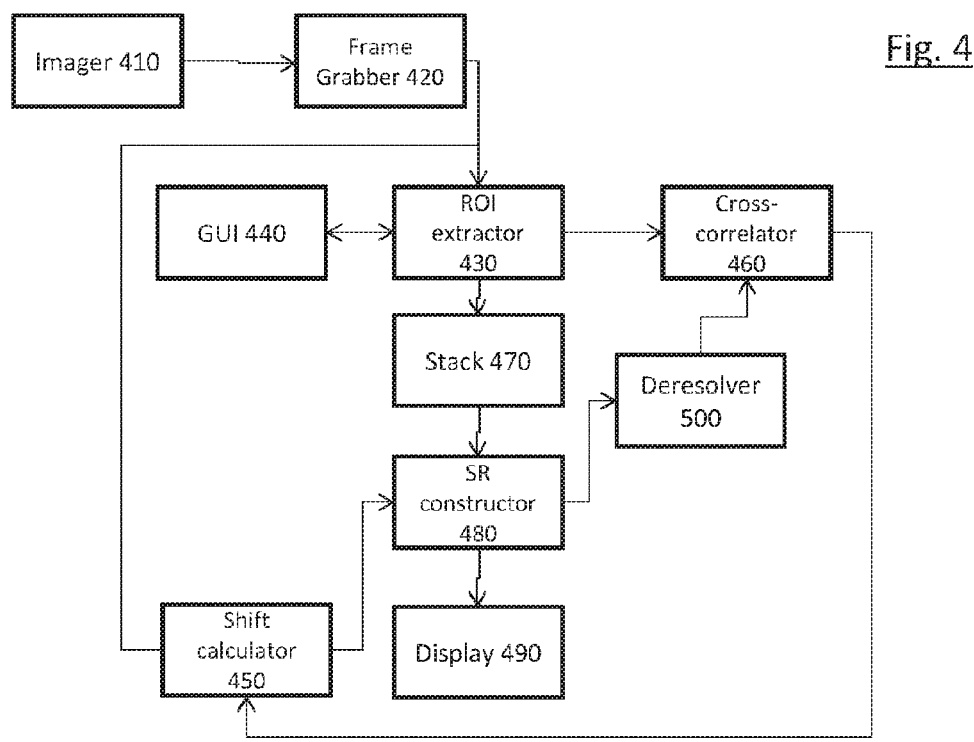
FIG. 4 is a block diagram showing components of an apparatus according to an example embodiment of the invention.

An example embodiment of the invention will now be described in more detail (FIG. 4). An imager 410—for example an image signal feed from a digital camera mounted on an aerial vehicle—provides a stream of images. Respective images from that stream are extracted by a frame grabber 420 and provided to a Region of Interest extraction module 430. On a first pass of the method, the ROI extraction module 430 interfaces with a user, via a Graphical User Interface 440, to define a region of interest. In subsequent passes, the region of interest is identified using integer shift information provided by a shift calculator 450. The ROI extractor 430 supplies the ROI to a cross-correlator 460 and also stores it on a stack 470. A super-resolution module 480 retrieves stored ROIs from the stack 470 and, using fractional shift information from the shift calculator 450, creates a super-resolved image, which is presented on a display 490 to a user. The image is also passed to a de-resolution module 500, which in turn passes a de-resolved image to the cross-correlator 460. The output from the cross-correlator 460 is passed to the shift calculator 450.

Figure 5:
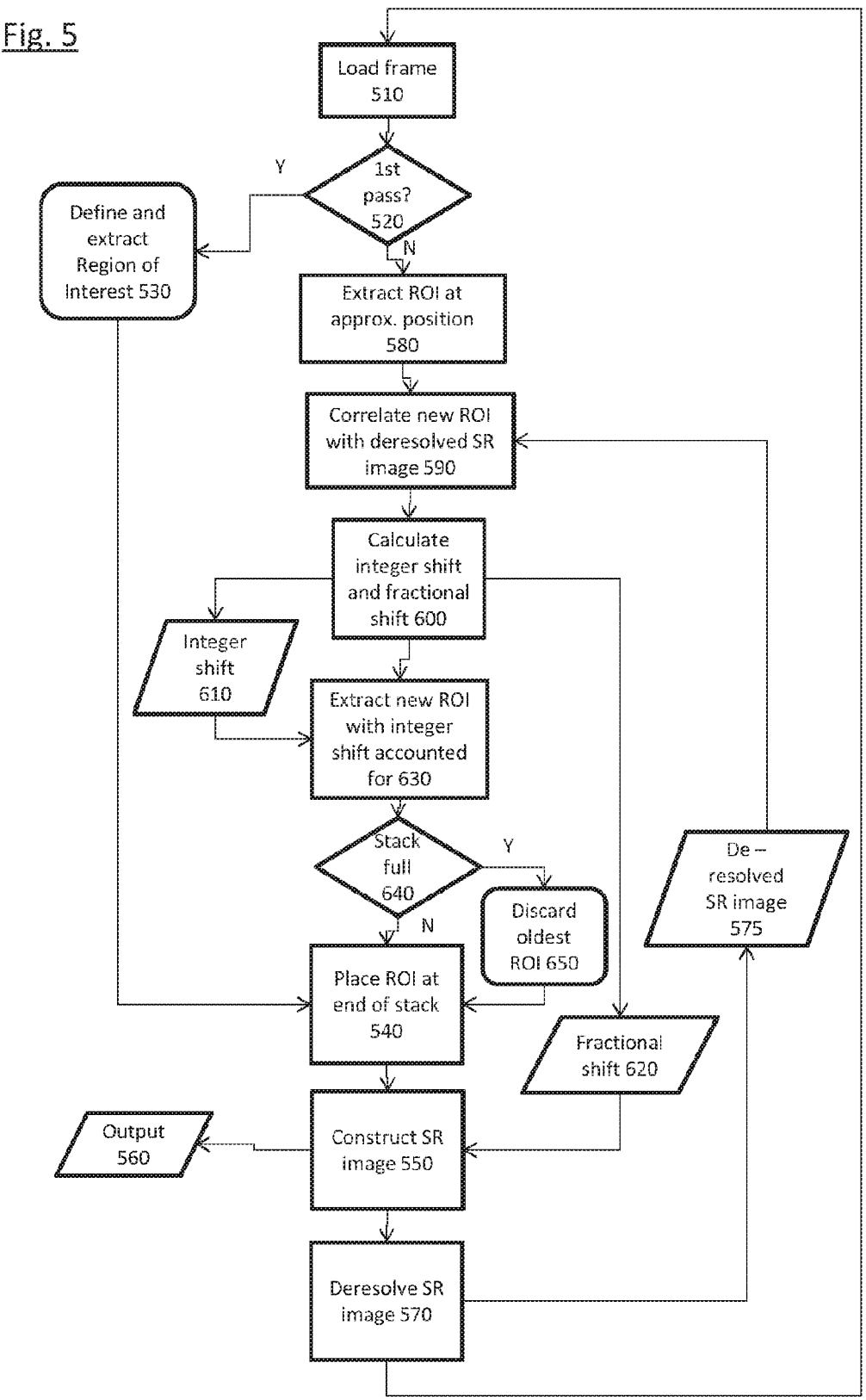
FIG. 5 is a flow chart showing steps in a method according to an example embodiment of the invention.

The example method will now be described in more detail, with reference to FIG. 5. An image frame is loaded (step 510) by the frame grabber 420 from the imager 410. The image frame is in the form of an array of pixels. If this is the first pass of the method (decision step 520), a user uses the GUI 440 to identify the location of a target object in the image frame. The user defines in the image frame a portion that is a region of interest including the target object (step 530). Typically, the frame portion will be the pixels making up the target object, together with a small border surrounding the target object, providing a margin in the frame, to allow for future movement of the object in subsequent frames. The pixels corresponding to the identified frame portion (i.e. the region of interest) are extracted by the ROI extractor 430 from the frame and are stored for further processing, by placing them at the end of an image-processing stack 470 (step 540).

A super-resolution module 480 retrieves the images from the stack 470 and constructs a super-resolved image (step 550). On the first pass of the method, only one frame portion has been stored, and so on this first pass the "super-resolved" image is in fact identical to the first frame portion. The super-resolved image is output to the display 490 (step 560). A "de-resolved" image 575 is calculated (step 570), by a de-resolution module 500, from the "super-resolved" image, for use in subsequent passes; again, in the first pass, the "de-resolved" image 575 is identical to the first frame portion.

After the first pass is completed, the method begins again for a second pass.

A second image frame is loaded by the frame grabber 420 (step 510). A working frame portion is extracted (step 580) from the second image frame by the ROI extractor 430. The working frame portion is extracted from the approximate location of the target object, in this example the same set of pixel locations as were extracted to form the first frame portion.

Next, the working frame portion is cross-correlated (step 590), in the cross-correlator 460, with the de-resolved image produced by the de-resolution module 500 in the first pass of the method. The change in position of the target in the working frame portion compared with the position of the target in the de-resolved first-pass image is thereby calculated by the shift calculator 450 (step 600). That change in position is broken down into a shift of a whole number of pixels (i.e. an integer shift 610) and a shift of a fraction of a pixel (i.e. a fractional shift 620). The integer-shift 610 is used to define a location for a second frame portion, i.e. the location of the first frame portion is translated by the integer shift 610 to give the location for a second frame portion. The pixels forming the second frame portion, corresponding to a re-located region of interest, are extracted (step 630). An assessment is made as to whether the stack 470 is full (decision step 640); if it is not, the pixels forming the second frame portion are simply added to the image-processing stack 470 (step 540). Thus, two frame portions have been stored on the stack 470, after the second pass of the method.

A super-resolved image is constructed (step 550) by the super-resolution construction module 480 from the frame portions stored on the stack 470, and output (step 560) to the display 490 for a user. A de-resolved image 575 is calculated (step 570) from the super-resolved image by the de-resolution module 500, and used in the cross-correlator 460 (step 590) for determination of the location of subsequent frame portions.

In subsequent passes, the method carried out in the second pass is repeated, each time using the location of the frame portion of the previous pass as the location of the working frame portion for the present pass, and using the de-resolved image 575 from the previous pass in the cross-correlator 460 to determine the change in position of the target. Thus, a further image frame is loaded (step 510). A working frame portion is extracted from the further image frame (step 580). The working frame portion is extracted from the approximate location of the target object, in this example the same set of pixel locations as were extracted to form the previous frame portion.

In step 590, the working frame portion is cross-correlated with the de-resolved image 575 from the preceding pass of the method. The change in position of the target in the working frame portion compared with the position of the target in the de-resolved image 575 is thereby obtained. That change in position is broken down (step 600) into a shift of a whole number of pixels (i.e. an integer shift 610) and a shift of a fraction of a pixel (i.e. a fractional shift 620). The integer shift 610 is used to define a location for a further frame portion, i.e. the location of the preceding frame portion is translated by the integer shift 610 to give the location for the further frame portion. The pixels forming the further frame portion, corresponding to a re-located region of interest, are extracted (step 630). An assessment is made as to whether the stack 470 is full (decision step 640); if it is not, the pixels forming the further frame portion are simply added to the image-processing stack 470 (step 540).

The stack 470 is of a finite size; in this example, it is able to store 20 frame portions. If the decision step 640 determines that the stack 470 is full, the oldest frame portion in the stack 470 is discarded (step 650), before the further frame portion is added to the stack 470 (step 540).

A super-resolved image is constructed (step 550) from the frame portions stored on the stack 470, and output to a user (step 560). A de-resolved image 575 is calculated (step 570) from the super-resolved image, and used in the cross-correlation step 590 for determination of the location of subsequent frame portions.

A method according to an example embodiment of the invention was applied to infrared sequences of ground targets captured using a cooled, long-wave CEDIP camera. When the first frame of the sequence is loaded, by frame grabber 420, the user is prompted to select on the GUI 440 the top left and bottom right corners of a window enclosing the target which is to be tracked and super-resolved. This window is subsequently cropped by the ROI extractor 430 from the frame, generating a first LR image, and is also cropped from the next frame, generating the second LR frame, and these two frames are then registered. If there is more than an integer pixel shift between the first and second frames, the crop window for the second frame is moved by the integer pixel amount and cropped again to obtain a LR image in which the target has only moved by a sub-pixel displacement relative to the initial frame. This process is repeated for subsequent frames to obtain a stack of LR images in which the target only has sub-pixel displacements from the original image. The process relies on the frame rate of the video sequence being very much greater than the motion of the target, so that the target is fully captured in each cropped window to allow the registration to function reliably. The size of the image stack (or buffer) that needs to be created is another parameter of the problem and should be larger if larger magnifications are sought. Once the image stack is full, then, when moving to a new frame, the oldest image in the stack is discarded and replaced with a new cropped window and super resolution repeated on the new image stack.

Figure 6:
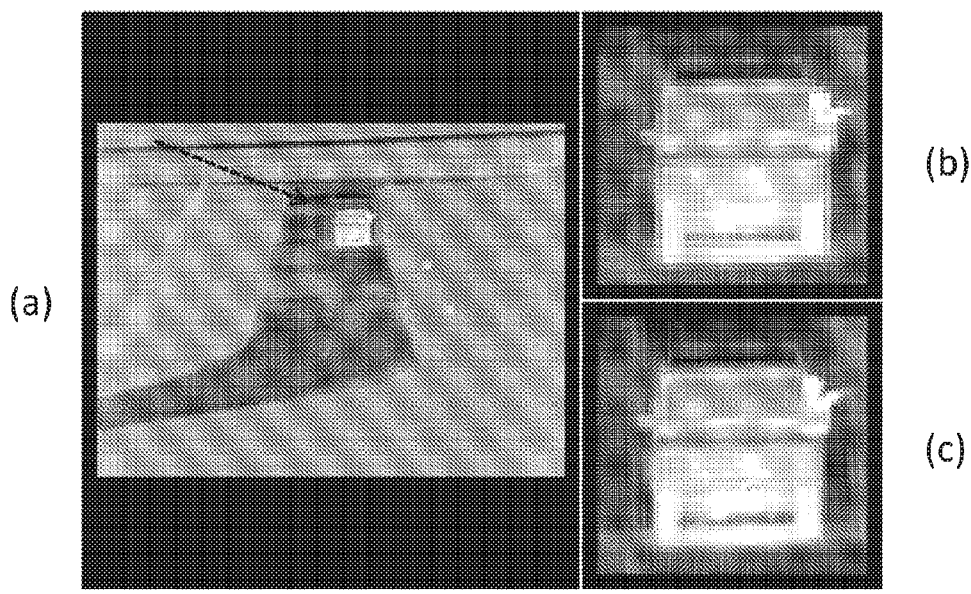
FIGS. 6 to 9 are each three images recorded by a stationary infrared camera of a moving target, being (a) a whole scene including a target and a region of interest defined around the target (in each case the target and the region of interest defined around the target is indicated by a white arrow in broken line), (b) an image of the region of interest, enlarged using nearest-neighbour interpolation, and (c) the image of (b) enhanced by a super-resolution method according to an example embodiment of the invention (in FIG. 6, the stack size is 25 images and the scale factor is 5.
Figure 7:
Figure 8:
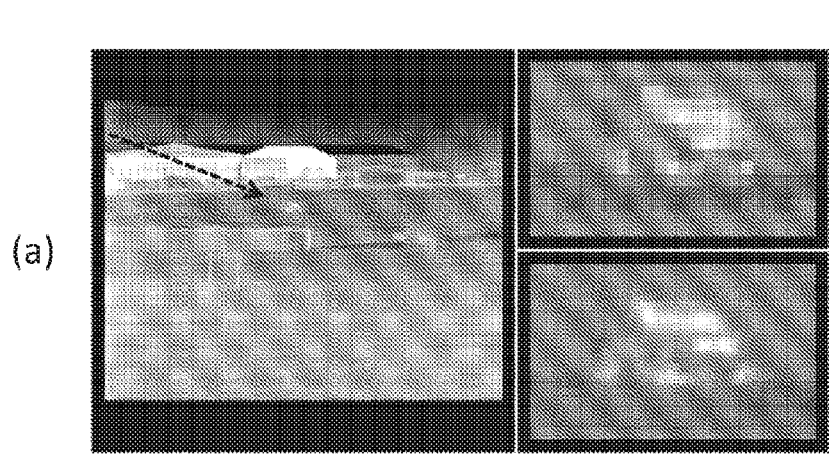
Figure 9:
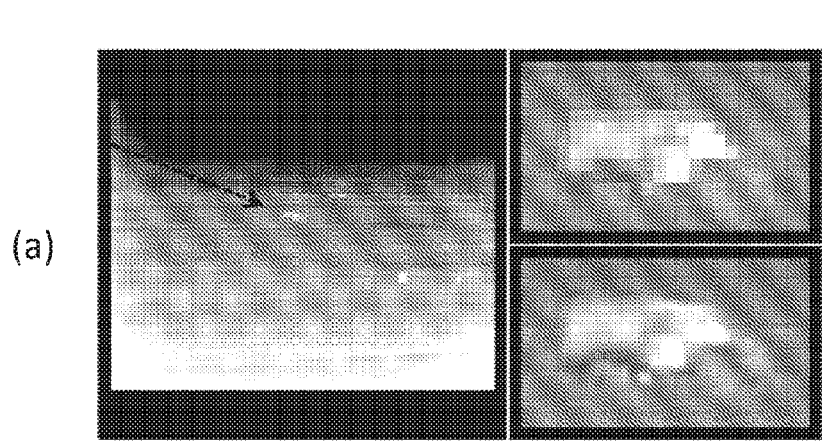

Results from various infrared sequences in which a stationary camera records a moving target are displayed in FIGS. 6 to 9. In each of these images, the left-hand frame shows the whole scene with a box on the tracked region of interest, the top-right image displays the region of interest enlarged to the super-resolution scale using nearest-neighbour interpolation, and the bottom-right image displays the super-resolved image. The stack size in FIG. 6 is 25 images and the scale factor (magnification) is 5; the stack size in FIGS. 7 to 9 is 100 images and the scale factor is 10.

In each of FIGS. 6 to 9, a significant improvement in resolution is achieved by the example method according to the invention.

The inventors have demonstrated enhancement of the spatial resolution of an image using multiple temporal views of a scene, in which there are sub-pixel shifts between views. It has been demonstrated that it is possible to greatly improve the amount of detail contained within an image.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the example embodiment described above, the target is identified in the image frame by a user, and the region of interest for which the image portion is extracted is defined by the user. In alternative embodiments, one or both of those operations is automated. For example, the target may be identified in the image frame by a target-recognition algorithm. Similarly, the region of interest, and hence the extracted frame portion, comprising the target object may be defined by a computer around the target object once the location of the target object itself has been identified, whether automatically or by a user. In another example embodiment, a user defines the region of interest after a target-recognition algorithm has identified the target.

In the example embodiment described above, the calculations for producing a "super-resolved" and "de-resolved" image are carried out even on the first pass of the method, which results in the first "super-resolved" and "de-resolved" images being identical to the first stored frame portion. In alternative embodiments, the super-resolution and/or de-resolution calculations are bypassed for the first pass. In alternative embodiments, the super-resolution and de-resolution calculations are bypassed on each pass until a predefined minimum number of image portions are on the stack, for example until the stack is full.

In the example embodiment described above, the target is relatively slow moving, and the region of interest defined during the first pass is large enough for the working frame portion to be the same set of pixel locations as were extracted from the first frame portion. In alternative embodiments, in which the target moves faster, or in which a smaller region of interest is defined, the likely location of the target is estimated from the presumed movement of the target, or measured using some other tracking algorithm, so that the working frame portion is a region of interest around the estimated likely location of the target. The change in position of the target in the working frame portion compared with the position of the target in the de-resolved image is thereby obtained taking into account, as well as the change in position of the target within the frame portion, the shift in the location of the frame portion itself.

In the example embodiment described above, the super-resolved images are output to a user. In alternative embodiments, the super-resolved images are passed to a further automated unit, where they are used in further automated processes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An image-processing method comprising the steps of:
   (i) obtaining an image including a target object, the image being formed by an array of pixels;
   (ii) extracting a frame portion from the image, the frame portion being at least a portion of the pixels forming the image, corresponding to a region of interest in the image, the region of interest comprising the target object and the frame portion having an associated phase, representative of a sub-pixel translation shift of the region of interest defined by the frame portion relative to the region of interest defined by another frame portion;
   (iii) storing the frame portion in the stack, the storing including discarding an oldest previously stored frame portion from the stack if the number of frame portions stored in the stack has reached the predetermined number;
   (iv) repeating steps (i) to (iii) a plurality of times; and
   (v) calculating a super-resolved image from a plurality of phase averages, wherein each phase average is the average of frame portions in the stack having the same phase, wherein the frame portions of each phase average have an associated phase representative of a sub-pixel translation shift of the regions of interest defined by those frame portions relative to the region of interest defined by another frame portion.

2. A method as claimed in claim 1, in which the target object is identified in the first image by a user or a target recognition algorithm.

3. A method as claimed in claim 1, in which the region of interest is defined by a user or by an algorithm in the first image and then calculated in subsequent images.

4. A method as claimed in claim 1, in which a shift in the position of the target in successive images is calculated, and the integer part of the calculated shift is used to shift the region of interest in the later image relative to the position of the region of interest in the earlier image.

5. A method as claimed in claim 1, in which a working frame portion is extracted from each subsequent image.

6. A method as claimed in claim 1, in which the translation shift between a pair of images is calculated by a correlation.

7. A method as claimed in claim 1, in which a translation shift between a first pair of frame portions is calculated and the resulting calculated translation shift is used in calculating a first super-resolved image derived from a first set of frame portions including said first pair of frame portions, and then subsequently a second super-resolved image is calculated from a second set of frame portions, different from the first set, but still including said first pair of frame portions, wherein the second super-resolved image is calculated using the previously calculated translation shift.

8. A method as claimed in claim 1, in which the calculation of the super-resolved image includes updating a super-resolved image calculated in a previous iteration by changing in the calculation only the phases which have changed in a new frame.

9. A method as claimed in claim 1, in which the calculation of a super-resolved image from the plurality of stored frame portions includes updating a super-resolved image calculated in a previous iteration by removing the oldest frame from its corresponding phase average, adding the new frame to its corresponding phase average, and updating the phase average over phases with the two modified phases.

10. A method as claimed in claim 1, in which the calculation of the super-resolved image includes a deblurring step.

11. A method as claimed in claim 1, in which the calculation of the super-resolved image is bypassed on each iteration until a predefined minimum number of frame portions have been stored on the stack.

12. An image-processing apparatus comprising:
   (i) an imager for obtaining an image including a target object, the image being formed by an array of pixels;
   (ii) a stack of for storing a predetermined number of frame portions;
   (iii) an image processor configured to
      a. extract a frame portion from the image, the frame portion being at least a portion of the pixels forming the image, corresponding to a region of interest in the image, the region of interest comprising the target object, the frame portion having an associated phase, representative of a sub-pixel translation shift of the region of interest defined by the frame portion relative to the region of interest defined by another frame portion;
      b. store the frame portion in the stack, the storing including discarding an oldest previously stored frame portion from the stack if the number of frame portions stored in the stack has reached the predetermined number; and
      c. calculating a super-resolved image from a plurality of phase averages, wherein each phase average is the average of frame portions in the stack having the same phase, wherein the frame portions of each phase average have an associated phase representative of a sub-pixel translation shift of the regions of interest defined by those frame portions relative to the region of interest defined by another frame portion.

13. A missile seeker including an image processing apparatus according to claim 12.

14. A computer program product embodied on non-transitory, computer-readable medium and configured to cause, when the computer program is executed, data-processing apparatus to:
   (i) receive an image including a target object, the image being formed by an array of pixels;
   (ii) extract a frame portion from the image, the frame portion being at least a portion of the pixels forming the image, corresponding to a region of interest in the image, the region of interest comprising the target object, the frame portion having an associated phase, representative of a sub-pixel translation shift of the region of interest defined by the frame portion relative to the region of interest defined by another frame portion;
   (iii) store the frame portion in a stack for storing a predetermined number of frame portions, the storing including discarding an oldest previously stored frame portion from the stack if the number of frame portions stored in the stack has reached the predetermined number;
   (iv) repeat steps (i) to (iii) a plurality of times; and
   (v) calculating a super-resolved image from a plurality of phase averages, wherein each phase average is the average of frame portions in the stack having the same phase, wherein the frame portions of each phase average have an associated phase representative of a sub-pixel translation shift of the regions of interest defined by those frame portions relative to the region of interest defined by another frame portion.

* * * * *